(12) United States Patent
Kapusta, Jr. et al.

(10) Patent No.: US 8,223,892 B2
(45) Date of Patent: Jul. 17, 2012

(54) DATA EXCHANGE BETWEEN CHANNELS IN A DATA ACQUISITION SYSTEM

(75) Inventors: Ronald A. Kapusta, Jr., Waltham, MA (US); Hiroto Shinozaki, Tokyo (JP); Katsufumi Nakamura, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 1156 days.

(21) Appl. No.: 12/077,239

(22) Filed: Mar. 18, 2008

(65) Prior Publication Data
US 2009/0238309 A1  Sep. 24, 2009

(51) Int. Cl.
*H04L 27/06* (2006.01)
*H03K 9/00* (2006.01)

(52) U.S. Cl. ........................ 375/340; 375/316
(58) Field of Classification Search .................. 375/326, 375/340, 316, 324, 317
See application file for complete search history.

(56) References Cited

U.S. PATENT DOCUMENTS

| | | | | |
|---|---|---|---|---|
| 5,663,759 | A * | 9/1997 | Horng et al. | 348/222.1 |
| 2007/0088863 | A1* | 4/2007 | Mannava et al. | 710/22 |
| 2009/0118408 | A1* | 5/2009 | Cox et al. | 524/403 |
| 2009/0179322 | A1* | 7/2009 | Furman et al. | 257/712 |
| 2010/0309955 | A1* | 12/2010 | Jalfon et al. | 375/144 |

FOREIGN PATENT DOCUMENTS
WO   WO 2008015948 A1 *  2/2008

OTHER PUBLICATIONS

Britton, C. L. et al., "Design and Performance of Beam Test Electronics for the PHENIX Multiplicity Vertex Dectector," *IEEE Trans. on Nuclear Science*, 44:3, 283-288 (1997).
Malcovati, P. and Maloberti, F., "Integrated Microsystem for 3D Magnetic Field Measurements," *IEEE Aerospace and Electronic Systems Magazine*, 14:9, 43-46 (1999).
Britton, C.L. et al., "Design and Performance of Beam Test Electronics for the PHENIX Multiplicity Vertex Detector, " IEEE Trans. On Nuclear Science, 44:3, 283-288 (1997).
Malcovati, P. et al., "Integrated Microsystem for 3D Magnetic Field Measurements, " IEEE Aerospace and Electronic Systems Magazine, 14:9, 43-46 (1999).
Sumanen, L. et al., "A 10-bit 200-MS/s CMOS Parallel Pipeline A/D Converter", IEEE J. Solid-State Circuits, 36:7, 1048-1055 (2001).

* cited by examiner

*Primary Examiner* — David C. Payne
*Assistant Examiner* — Brian J Stevens
(74) *Attorney, Agent, or Firm* — Knobbe Martens Olson & Bear LLP

(57) ABSTRACT

An apparatus and method for inter-channel data exchange in multi-channel data acquisition systems is disclosed. A multi-channel data acquisition system may include a data exchange layer coupling two or more channels of the data acquisition system. Data may be transmitted via the data exchange layer between the channels, enabling data from one channel to be processed and output by another channel. The data exchange layer may include a serial exchange layer or a parallel exchange layer.

26 Claims, 7 Drawing Sheets

DATA EXCHANGE BETWEEN CHANNELS IN A DATA ACQUISITION SYSTEM

BACKGROUND

1. Field

The technology discussed relates to data acquisition systems having multiple data acquisition channels.

2. Discussion of Related Art

Data acquisition systems are used for a variety of applications. For instance, it may be desirable to acquire data relating to one or more physical properties of a system, device, or specimen, such as temperature, speed, pressure, mass, position, or chemical composition, to name a few. Data acquisition systems can be used to acquire these types of data.

In operation, data acquisition systems often receive an input signal, sometimes referred to as a raw signal, and output a desired output signal. The input signal may be a signal measured by, or produced by, a sensor, such as a temperature or pressure sensor. The input signal could be an analog signal or a digital signal, and could constitute a current or a voltage. After receiving the input signal, the data acquisition system may process the input signal to produce the desired output signal. The input signal may be processed in any number of ways, such as filtering, scaling, sampling, averaging, amplifying, duplicating, formatting, or converting from one signal type to another (e.g., analog to digital, or vice versa). After processing the input signal, an output signal may be provided by the data acquisition system representing the desired information (e.g., temperature, pressure, etc.).

The design of a data acquisition system often depends on the type of data to be acquired and the type of output desired. For acquisition of data in simple systems, such as a system measuring a single physical characteristic of a specimen (e.g., mass), the data acquisition system may use only a single channel, and there may be little or no processing of the input signal to provide the desired output. However, for more complex measurements, such as those for which multiple data sets or multiple forms of data are acquired and processed to produce a desired output, a more complex data acquisition system structure might be appropriate.

Some data acquisition systems have multiple data acquisition channels to acquire and process complex types of data and to produce complex desired outputs. The different data acquisition channels may each operate to provide a subset of the total system data sought. For example, an image acquisition system may have multiple data channels, with each channel used to acquire and process data relating to different colors of the image, different pixels of the image, or different parameters of the image.

While conventional data acquisition systems are appropriate for some settings, it is desirable to provide new data acquisition systems.

SUMMARY

According to an aspect of the present invention, an apparatus and method are provided enabling communication between multiple channels of a multi-channel data acquisition system. The multiple channels may be located on a single semiconductor die (also referred to as a "chip"), or may be divided between two or more semiconductor dies, or may be located within different packages. In one embodiment, the multiple data acquisition channels are located on separate semiconductor dies as part of a multi-chip data acquisition module. The communication between channels may be provided by a data exchange layer, which may be a serial data exchange layer, a parallel data exchange layer, or any other type of data exchange layer.

According to one aspect of the invention, a multi-channel data acquisition system providing inter-channel communication is disclosed. The multi-channel data acquisition system comprises a plurality of data acquisition channels comprising a first data acquisition channel configured to receive and process a first data input signal to produce a first processed data signal, and a second data acquisition channel configured to receive and process a second data input signal to produce a second processed data signal. The multi-channel data acquisition system further comprises a data exchange layer coupling the first data acquisition channel and the second data acquisition channel and configured to transmit the first processed data signal from the first data acquisition channel to the second data acquisition channel.

According to another aspect of the invention, a multi-chip module comprises a first chip comprising at least one first data acquisition channel configured to receive and process a first data input signal. The multi-chip module further comprises a second chip comprising at least one second data acquisition channel configured to receive and process a second data input signal. The multi-chip module further comprises a data exchange layer coupling the first chip and the second chip and configured to transmit data processed on the at least one first data acquisition channel to the at least one second data acquisition channel. The multi-chip module further comprises a package at least partially encasing the first chip and the second chip and comprising a first input terminal coupled to the first chip to provide the first data input signal to the first chip, and a second input terminal coupled to the second chip to provide the second data input signal to the second chip.

According to another aspect of the invention, a method is disclosed. The method is for use in a multi-channel data acquisition system comprising a first data acquisition channel configured to receive and process a first data input signal to produce a first processed data signal, a second data acquisition channel configured to receive and process a second data input signal to produce a second processed data signal, and a data exchange layer coupling the first data acquisition channel and the second data acquisition channel. The method comprises transmitting the first processed data signal from the first data acquisition channel to the second data acquisition channel and performing at least one signal processing function on the first processed data signal using the second data acquisition channel.

According to another aspect of the invention, an expandable multi-channel data acquisition system is disclosed. The expandable multi-channel data acquisition system comprises a first data acquisition channel, and a second data acquisition channel coupled to the first data acquisition channel by a data exchange layer. The first data acquisition channel and the second data acquisition channel are substantially functionally identical, each of the first and second data acquisition channels capable of performing the functions of acquiring a data input signal, processing the data input signal, and sending processed data signals to, and/or receiving processed data signals from, a functionally identical data acquisition channel via the data exchange layer.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
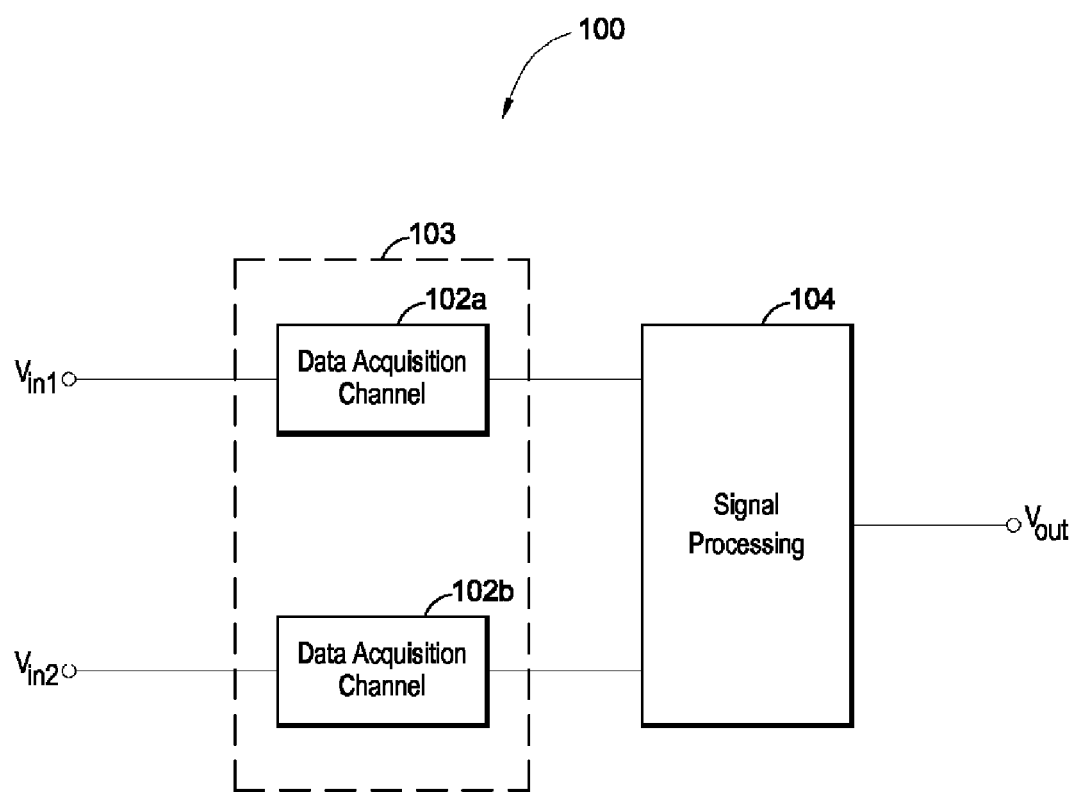
FIG. 1 is a block diagram of a multi-channel data acquisition system having off-chip signal processing.

FIG. 1 shows a data acquisition system having multiple data acquisition channels. The data acquisition system 100 includes data acquisition channel 102a and data acquisition channel 102b located on a semiconductor die, or chip, 103. The data acquisition channels receive respective input signals $V_{in1}$ and $V_{in2}$, which are designated as input voltage signals. An off-chip signal processing block 104 receives output signals from the data acquisition channels 102a and 102b, processes these outputs, and then provides an output signal $V_{out}$.

While data acquisition systems such as that shown in FIG. 1 may be satisfactory for some applications, there remain drawbacks and limits to their design and operation. For example, Applicants have appreciated that data acquisition systems, such as data acquisition system 100 in FIG. 1, do not provide several features desirable for modern-day data acquisition systems. Accordingly, new data acquisition systems are desirable. For example, it is desirable to provide on-channel signal processing capabilities, as distinguished from the off-chip signal processing illustrated in FIG. 1. Furthermore, data acquisition systems may provide output signals for which it is desirable to process information, or data, from multiple channels of the data acquisition system in combination. Further still, it may be desirable to design data acquisition systems to allow maximum flexibility in expanding or modifying a previously designed data acquisition system to function satisfactorily for a new application. For example, it may be desirable to provide a data acquisition system capable of being expanded from one channel to any number of channels with minimal redesign, so as to meet specifications for applications requiring different numbers of channels. Accordingly, aspects of the present invention provide these, as well as other, benefits and advantages over conventional data acquisition systems.

According to aspects of the present invention, an expandable data acquisition system is provided. The data acquisition system may implement a modular approach in that the data acquisition system may comprise a plurality of substantially identical data acquisition channels. The plurality of data acquisition channels may be substantially identical in one or more of various ways. For example, the plurality of data acquisition channels may be substantially identical in functionality, with each data acquisition channel of the plurality of data acquisition channels capable of performing the functions of acquiring a data input signal, processing the data input signal, and communicating with other functionally identical data acquisition channels, for example by sending the processed data signals to, and/or receiving processed data signals from, a functionally identical data acquisition channel. Communication between the plurality of data acquisition channels may be provided by a data exchange layer, which may take any appropriate form, such as a bus.

The substantially identical nature of the plurality of data acquisition channels according to aspects of the present invention may facilitate expansion of the data acquisition system to any desired number of data acquisition channels. This modular nature of the data acquisition channels enables expansion of the data acquisition system regardless of the form and/or positioning of the channels. For example, if multiple data acquisition channels are on a same chip, the data acquisition system can be expanded by adding data acquisitions on the chip. Similarly, if the data acquisition channels are on different chips within a multi-chip module (MCM), the data acquisition system can be expanded by adding additional chips to the MCM comprising substantially identical data acquisition channels to those on the other chips in the MCM. Similarly, a data acquisition system comprising data acquisition channels in different packages can be expanded by adding additional packages comprising substantially identical data acquisition channels to those in the other packages of the data acquisition system. The data exchange layer may provide communication between the data acquisition channels regardless of whether they are on a single chip, multiple chips, or in different packages. According to one embodiment, the data acquisition channels may be substantially indistinguishable, so that two or more of them could be switched with each other with substantially no change in the functionality of the data acquisition system.

Figure 2:
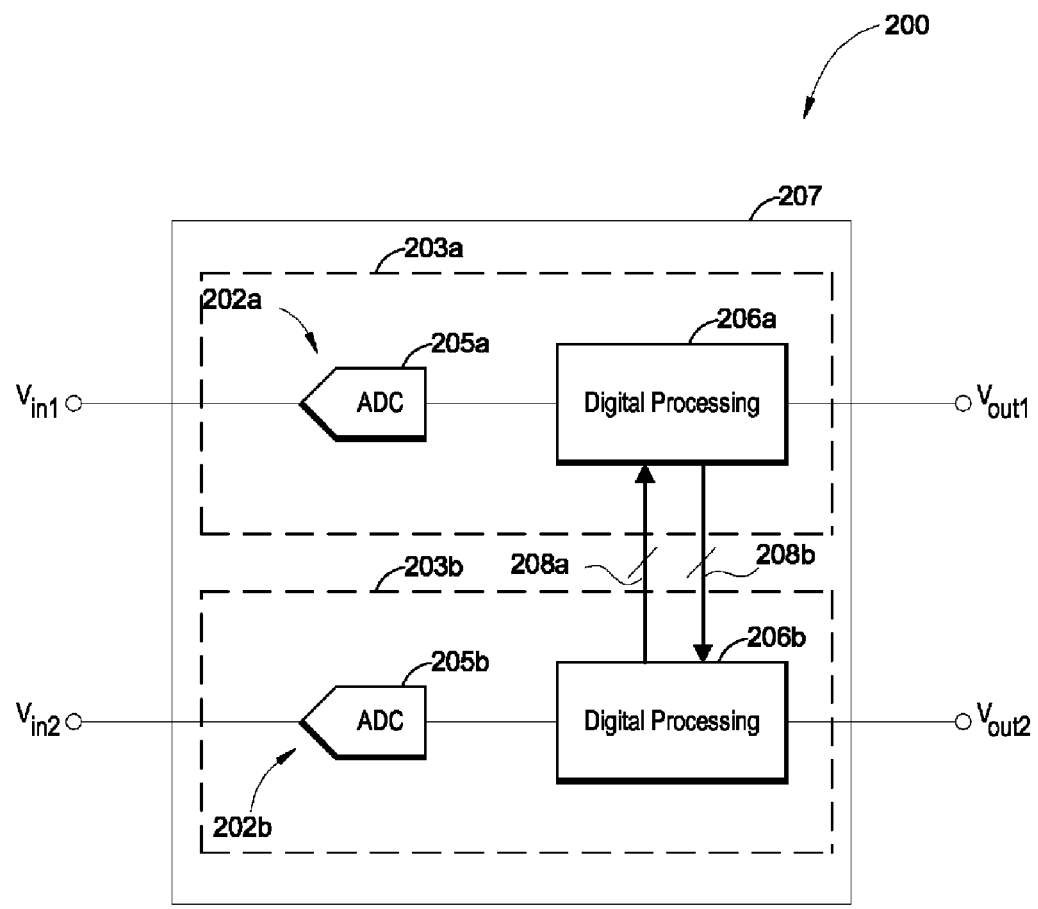
FIG. 2 is a block diagram of a multi-channel data acquisition system according to one embodiment of the present invention.

FIG. 2. illustrates a multi-channel data acquisition system according to an aspect of the present invention. The multi-channel data acquisition system 200 provides inter-channel data exchange, or communication, as well as on-channel signal processing, and has a design that can be easily expanded, for example to include more data acquisition channels than those shown. Furthermore, the multi-channel data acquisition system 200 may be any type of data acquisition system, such as an image acquisition system, as the invention is not limited in this respect.

The multi-channel data acquisition system 200 comprises a plurality of data acquisition channels, shown as two data acquisition channels, 202a and 202b. Data acquisition channel 202a is located on a first semiconductor die 203a, while data acquisition channel 202b is located on a second semiconductor die 203b. However, the invention is not limited in this respect, as both data acquisition channels could be located on a same semiconductor die. Data acquisition channel 202a comprises an analog-to-digital converter (ADC) 205a and a digital processing subcircuit 206a. ADC 205a receives an analog input signal $V_{in1}$ and provides a digitized signal to an input of the digital processing subcircuit 206a. The digital processing subcircuit 206a may process the digital signal from ADC 205a in one or more ways, for example by filtering, scaling, sampling, averaging, formatting, and/or amplifying the digital signal. The invention is not limited to any particular type of processing performed by digital processing subcircuit 206a.

Data acquisition channel 202b may be approximately identical to data acquisition channel 202a, such that the two channels may be substantially identical in one or more of the following ways: channel circuitry; fabrication mask layout; channel operation/functionality; or any other characteristic of the channels. Accordingly, in FIG. 2, data acquisition channel 202b comprises ADC 205b and digital processing subcircuit 206b. ADC 205b may be substantially identical to ADC 205a, and digital processing subcircuit 206b may be substantially identical to digital processing subcircuit 206a. As shown, ADC 205b receives an analog input signal $V_{in2}$ and provides a digitized signal to digital processing subcircuit 206b, which may perform any type of processing on the digitized signal from ADC 205b, such as those types of processing mentioned with respect to digital processing subcircuit 206a.

The data acquisition system 200 provides two output signals, $V_{out1}$ and $V_{out2}$. $V_{out1}$ is provided by data acquisition channel 202a, while $V_{out2}$ is provided by data acquisition channel 202b. The output signals $V_{out1}$ and $V_{out2}$ may be digital signals, and may represent any desired quantity, as the data acquisition system 200 is not limited in this respect. For example, because of the data exchange layer (described further below), either of $V_{out1}$ and $V_{out2}$, or both of them, can provide information relating to either input $V_{in1}$ and $V_{in2}$, or some combination of $V_{in1}$ and $V_{in2}$. Furthermore, the data acquisition system 200 may only provide a single output signal (e.g., $V_{out1}$) at any given time, or alternatively, may be designed to only have the capability to provide one output.

The multi-channel data acquisition system 200 includes the capability for inter-channel data exchange, or communication, which may be desirable for any number of reasons. For example, it may be desirable to process data from more than one channel in combination to provide a desired output, or to pass an output of one channel through a second channel to a third channel. Other reasons for communicating between channels may also be possible. To illustrate this point, the data acquisition system 200 may be an image acquisition system, for which channels 202a and 202b receive and process data related to different colors of the image. One desired output of the image acquisition system may be a value representing a total luminance of the image. The luminance may be a combination or function of data corresponding to different colors of the image, and thus data received and processed by the different channels 202a and 202b. Accordingly, to provide the desired output representative of a total luminance of an image, it may be desirable to process data from channels 202a and 202b in combination, for example, by adding, subtracting, or otherwise combining the data. Similarly, the channels 202a and 202b may receive and process data conveying spatial information about an image, such as if the different channels of the data acquisition system provide information relating to different pixels, or locations, within an image. In this scenario, it may be desirable to process data from channels 202a and 202b in combination to provide a completed image. Accordingly, inter-channel communication may be desirable.

To provide inter-channel data exchange capabilities, the multi-channel data acquisition system 200 comprises a data exchange layer coupling channels 202a and 202b. In the specific, yet non-limiting, implementation of FIG. 2, the data exchange layer comprises busses 208a and 208b coupling digital processing subcircuits 206a and 206b so that the digital processing subcircuits may exchange data in the form of raw or processed signals. Thus, the busses 208a and 208b enable data exchange in the digital domain between the digital processing subcircuits of the data acquisition channels of the data acquisition system.

More generally speaking, the inclusion of a data exchange layer enables communication between two or more of the multiple channels in a multi-channel data acquisition system, thus providing greater functionality than conventional systems with parallel channels operating in relative isolation. In particular, the data exchange layer enables the various channels of a multi-channel data acquisition system to perform complex, dynamic, on-channel processing. For example, data acquisition channel 202b, by way of digital processing subcircuit 206b, can process data from data acquisition channel 202b itself, or from data acquisition channel 202a, or any combination thereof. Therefore, the on-channel processing capabilities of data acquisition system 200 are greatly enhanced over prior systems, and enable data acquisition system 200 to provide high quality operation for complex and dynamic data acquisition applications.

Moreover, it should be appreciated that the specific implementation of the data exchange layer in FIG. 2 is non-limiting. For example, more than two busses may be provided, or only a single bus may be provided, as the invention is not limited in this respect. Likewise, the busses 208a and 208b may be any type of bus, and may provide any number of bits, such as 8 bits, 10 bits, 14 bits, or any other number of bits. Furthermore, the data exchange layer may comprise any type of coupling, as a bus is merely one non-limiting example. Other examples of possible couplings include, but are not limited to, serial connections, wired or wireless connections, or any other type of coupling providing data exchange capabilities. Further still, the placement of the data exchange layer shown in FIG. 2, coupling the digital processing subcircuits 206a and 206b, is non-limiting. Other configurations of the data exchange layer are possible. For example, the data exchange layer may couple the output of an ADC of one channel (e.g., ADC 205a of channel 202a) to a digital processing subcircuit of another channel (e.g., digital processing subcircuit 206b). Other configurations for the data exchange layer are also possible.

It should also be appreciated that, as illustrated in FIG. 2, the semiconductor dies 203a and 203b are contained, or encased, at least partially within a package 207, thus making data acquisition system 200 a multi-chip module data acquisition system. Multi-chip modules (MCM) are devices which incorporate multiple semiconductor dies into a single package. Advantages of using a MCM design may include reduced circuit board area, reduced pin count, high matching of the channels, and a generally modular approach to circuit design which provides flexibility in circuit expansion and modification. Multi-channel applications, such as multi-channel data acquisition systems, may be implemented in the form of a MCM to benefit from one or more of the advantages listed, or for any other reason.

While data acquisition system 200 is shown as a MCM, it should be appreciated that the invention is not limited in this respect, as the data acquisition channels 202a and 202b could be packaged within separate packages, or not packaged at all. The data exchange layer may provide communication between channels on a same chip, on different chips, or between channels in different packages. Furthermore, the type of package 207 used is non-limiting, and may include a ball grid array (BGA) package, pin grid array package, or any other type of package. The package may comprise one or more input terminals (e.g., pins in a pin grid array package) to receive the input signals $V_{in1}$ and $V_{in2}$, and may comprise one or more output terminals to output signals $V_{out1}$ and $V_{out2}$. In some embodiments, for example if package 207 is a BGA package, means may be provided to couple the data acquisition channel inputs and/or outputs to the pads of the package. One non-limiting example of such means is a laminate. However, other means may be used, as the invention is not limited in this respect.

The design of the data acquisition system 200 provides the ability to expand the system with minimal or no redesign. For example, the data acquisition system 200 comprises multiple substantially identical channels. As shown, the data acquisition channels may be substantially identical in their circuitry and layout. They may also, or alternatively, be substantially identical in their functionality, with both data acquisition channels 202a and 202b capable of receiving a data input signal, processing the data input signal, and communicating with the other data acquisition channel. Thus, the system can be easily modified by adding or subtracting data acquisition channels to or from the system so as to modify the data acquisition system to meet one or more requirements of any given application.

Figure 3:
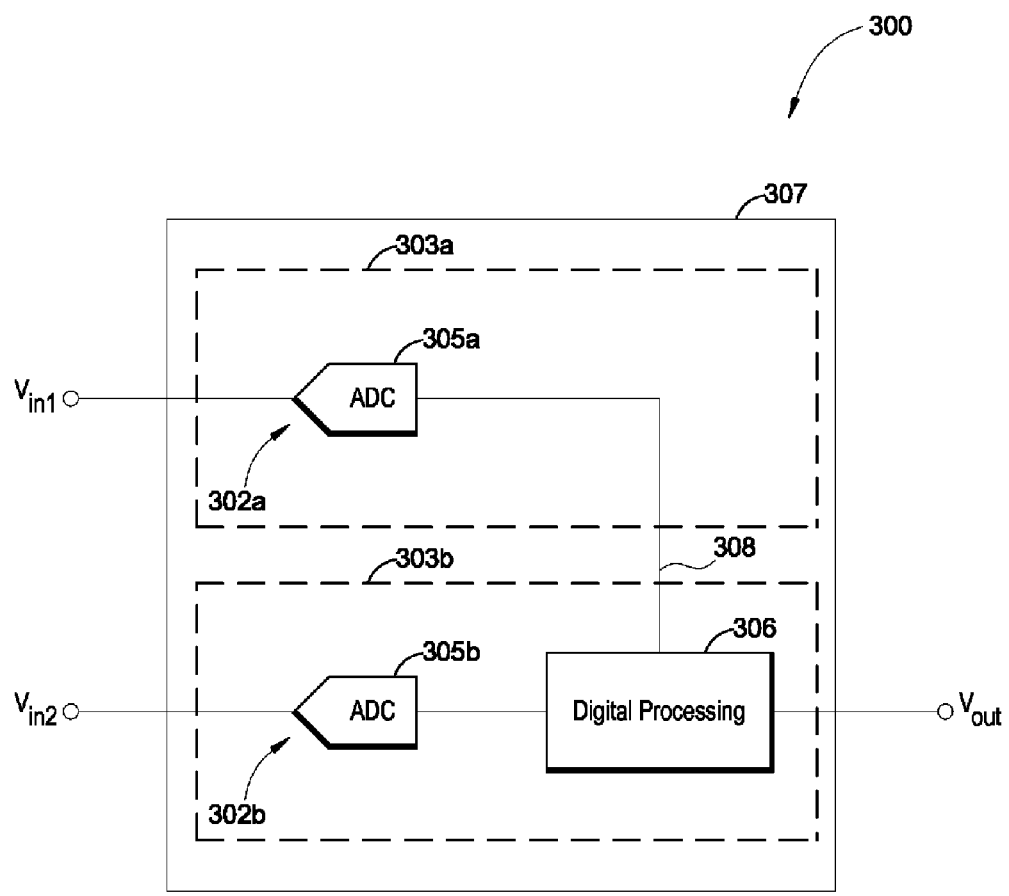
FIG. 3 is a block diagram of a multi-channel data acquisition system according to another embodiment of the present invention.

FIG. 3 is a block diagram of a multi-channel data acquisition system according to another aspect of the present invention. As illustrated, the data acquisition system 300 has a reduced number of outputs compared to a number of inputs. It may be desirable to design a data acquisition system to have a reduced number of outputs compared to a number of inputs for any number of reasons. For example, packaging considerations (e.g., limits on a number of available package pins or pads) may make it desirable to reduce a number of outputs relative to a number of inputs. Further, if a given output signal represents a combination of two or more input signals, it may be desirable to provide only a single output. Other reasons for reducing a number of outputs compared to a number of inputs are possible.

The multi-channel data acquisition system 300 comprises a plurality of data acquisition channels, shown as two data acquisition channels, 302a and 302b. Data acquisition channel 302a is located on a first semiconductor die 303a, while data acquisition channel 302b is located on a second semiconductor die 303b. However, the invention is not limited in this respect, as both data acquisition channels could be located on a same semiconductor die, or configured in any other arrangement.

Data acquisition channel 302a comprises ADC 305a. ADC 305a receives an analog input signal $V_{in1}$ and provides a digitized signal output. In contrast to data acquisition channel 202a in FIG. 2, data acquisition channel 302a does not have a digital processing subcircuit. Rather, as will be seen, processing of the output from ADC 305a may be performed by a digital processing subcircuit on a different data acquisition channel, such as digital processing subcircuit 306.

Data acquisition channel 302b may be similar in design to data acquisition channel 202b in FIG. 2, and thus may comprise ADC 305b and digital processing subcircuit 306. ADC 305b may be substantially identical to ADC 305a. As shown, ADC 305b receives an input analog signal $V_{in2}$ and provides a digitized signal to digital processing subcircuit 306, which may perform any type of processing on the digitized signal from ADC 305b. The digital processing subcircuit 306 provides an output $V_{out}$ of the data acquisition system 300.

The data acquisition system 300 further comprises data exchange layer 308 coupling ADC 305a and digital processing subcircuit 306. Data exchange layer 308 may be a bus, a serial communication means, wired or wireless communication means, or any other now known or later developed type of coupling providing data communication capabilities between channel 302a and channel 302b. The data exchange layer 308 enables the digital processing subcircuit to receive digital signals from ADC 305a. Therefore, the digital processing subcircuit 306 may process one or both of the digital signals from ADC 305a and 305b in one or more ways, for example by filtering, scaling, sampling, averaging, combining, formatting, and/or amplifying one or both of the digital signals. Accordingly, the data acquisition output signal $V_{out}$ may represent a processed form of the input signals $V_{in1}$ and $V_{in2}$, and may be a digital signal having any desired format.

As illustrated in FIG. 3, the semiconductor dies 303a and 303b are packaged, contained, or encased at least partially within a package 307, thus making data acquisition system 300 a MCM data acquisition system. While data acquisition system 300 is shown as a MCM, it should be appreciated that the invention is not limited in this respect, as the data acquisition channels 302a and 302b could be packaged within separate packages, or not packaged at all. As described in connection with package 207 of FIG. 2, the package 307 may be any type of package, now known or later developed, as the invention is not limited in this respect.

Figure 4A:
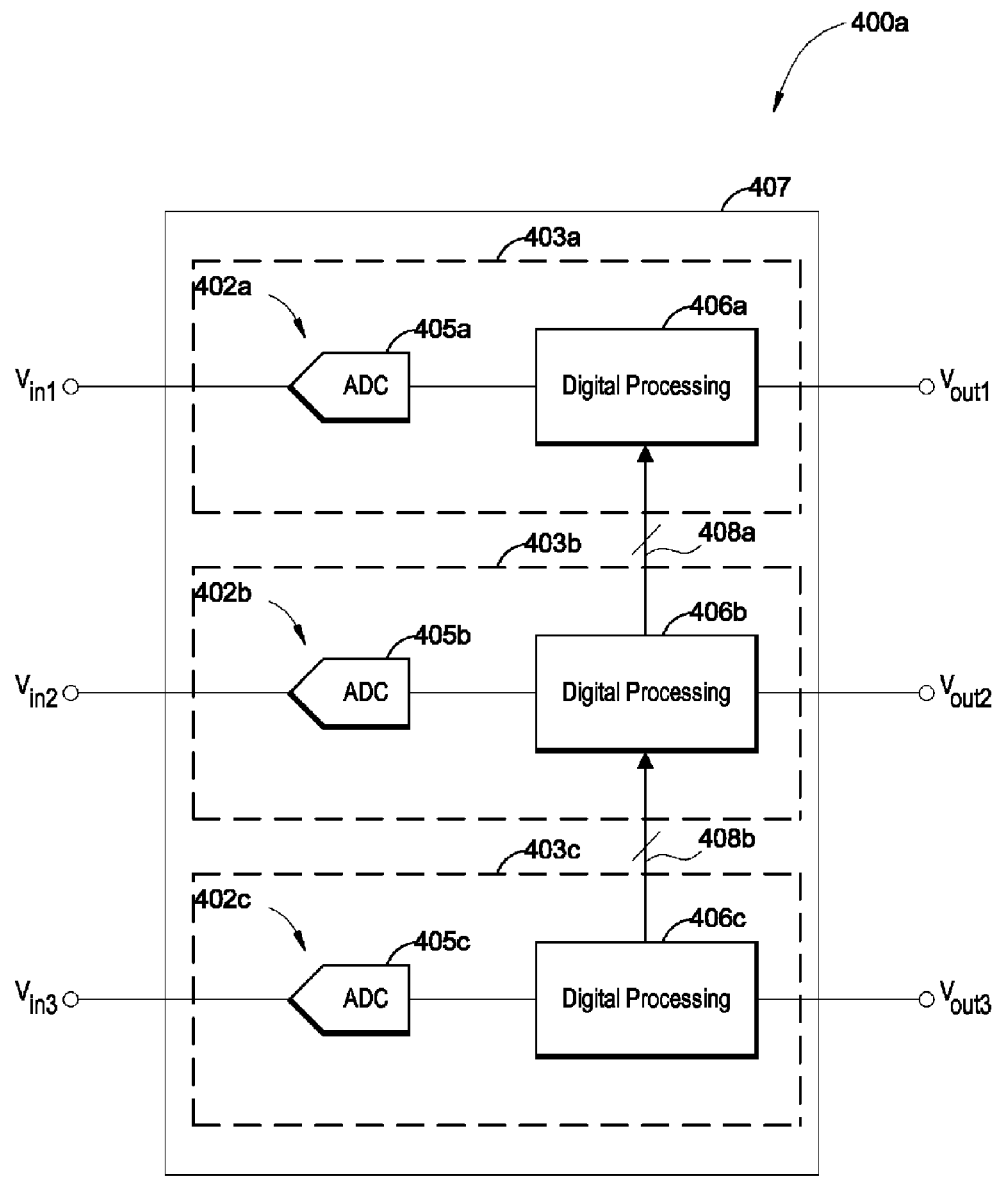
FIGS. 4A and 4B are block diagrams of different embodiments of a multi-channel data acquisition system providing communication between three or more channels.
Figure 4B:
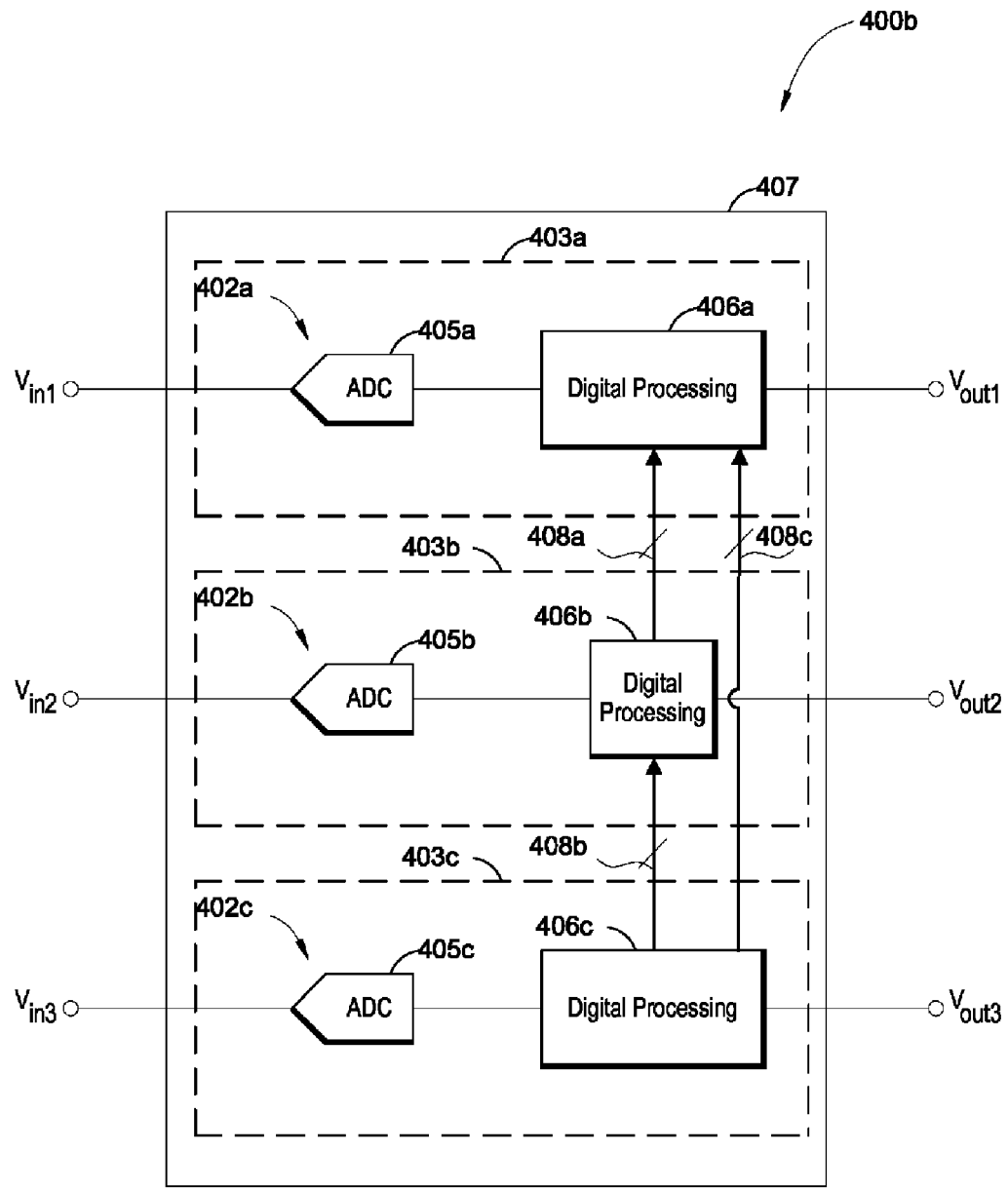

FIGS. 4A and 4B are alternative embodiments of a MCM multi-channel data acquisition system having inter-channel communication capabilities between three or more channels. The data acquisition systems 400a and 400b comprise semiconductor dies 403a, 403b, and 403c, which are at least partially packaged, contained, or encased within package 407. The semiconductor dies are shown as including respective data acquisition channels 402a, 402b, and 402c. Two or more of the data acquisition channels 402a, 402b, and 402c may be substantially identical, for example in their circuitry, fabrication mask layout, or operation/functionality, and may be similar to data acquisition channels 202a and 202b in FIG. 2. For example, the data acquisition channels 402a, 402b, and 402c may comprise a respective ADC 405a, 405b, and 405c, configured to receive respective input signals $V_{in1}$, $V_{in2}$, and $V_{in3}$. Further, the data acquisition channels 402a, 402b, and 402c may comprise a respective digital processing subcircuit 406a, 406b, and 406c, configured to receive a digitized signal from the respective ADCs and to perform one or more processing functions on those signals. Each digital processing subcircuit 406a, 406b, and 406c may be configured to provide a respective output signal of the data acquisition system, $V_{out1}$, $V_{out2}$, and $V_{out3}$. The output signals $V_{out1}$, $V_{out2}$ and $V_{out3}$ may be digital signals, and may represent any desired quantity, as the invention is not limited in this respect. Furthermore, the data acquisition systems 400a and 400b may only provide one or two output signals (e.g., $V_{out1}$ and $V_{out2}$) at any given time, or alternatively, may be designed to only have the capability to provide fewer outputs than inputs.

As shown, the data acquisition system 400a further comprises a data exchange layer coupling the data acquisition channels 402a, 402b, and 402c. In FIG. 4A, the data exchange layer comprises a bus 408a coupling digital processing subcircuits 406a and 406b, as well as a bus 408b coupling digital processing subcircuits 406b and 406c. Thus, in the embodiment illustrated in FIG. 4A, the data acquisition channels are coupled to neighboring data acquisition channels via the data exchange layer, and communication between non-neighboring data acquisition channels (e.g., data acquisition channels 402a and 402c) occurs by communicating through an intermediate data acquisition channel (e.g., data acquisition channel 402b). In this manner, one or more data acquisition channels (e.g., data acquisition channel 402b) may partially function as a pass-through for communication of raw or processed signals between non-neighboring data acquisition channels.

FIG. 4B illustrates an alternative embodiment of a multi-channel data acquisition system having inter-channel communication capabilities between three or more channels. The design of the data acquisition system 400b is similar to that of data acquisition system 400a, with a different configuration for the data exchange layer. As shown, the data exchange layer comprises busses 408a, 408b, and 408c. As in FIG. 4A, bus 408a couples digital processing subcircuits 406a and 406b, and bus 408b couples digital processing subcircuits 406b and 406c. However, the data exchange layer of data acquisition system 400b further comprises bus 408c coupling digital processing subcircuits 406a and 406c. Thus, in the embodiment of FIG. 4B, one or more data acquisition channels 402 may communicate with non-neighboring data acquisition channels both by communication through a neighboring data acquisition channel as a pass-through, as well as by communicating directly with a non-neighboring data acquisition channel.

To illustrate this point, digital processing subcircuit 406c of data acquisition channel 402c may communicate with neighboring data acquisition channel 402b via bus 408b. Furthermore, digital processing subcircuit 406c may communicate with non-neighboring data acquisition channel 402a either by communicating through channel 402b (i.e., communicating via busses 408b and 408a) or by communicating directly with data acquisition channel 402a via bus 408c.

It should be appreciated, as with the earlier described embodiments, that the data exchange layer in FIGS. 4A and 4B enables powerful communication and processing capabilities. The data exchange layer enables communication between two or more of the multiple channels in a multi-channel data acquisition system, thus providing greater functionality than conventional systems with parallel channels operating in relative isolation. Furthermore, the data exchange layer enables the various channels of a multi-channel data acquisition system to perform complex, dynamic, on-channel processing.

The data exchange layer in FIGS. 4A and 4B is illustrated in a non-limiting manner as comprising one or more busses. However, the data exchange layer may comprise any appropriate coupling means, including serial or parallel communication means, and wired or wireless communication means. The data exchange layer may comprise one or more busses, or any other type of appropriate coupling. Furthermore, while the busses 408a and 408b are shown as transmitting signals in one direction, it will be appreciated that they (and any of the data exchange layers disclosed herein) may communicate signals to and/or away from a data acquisition channel.

Figure 5:
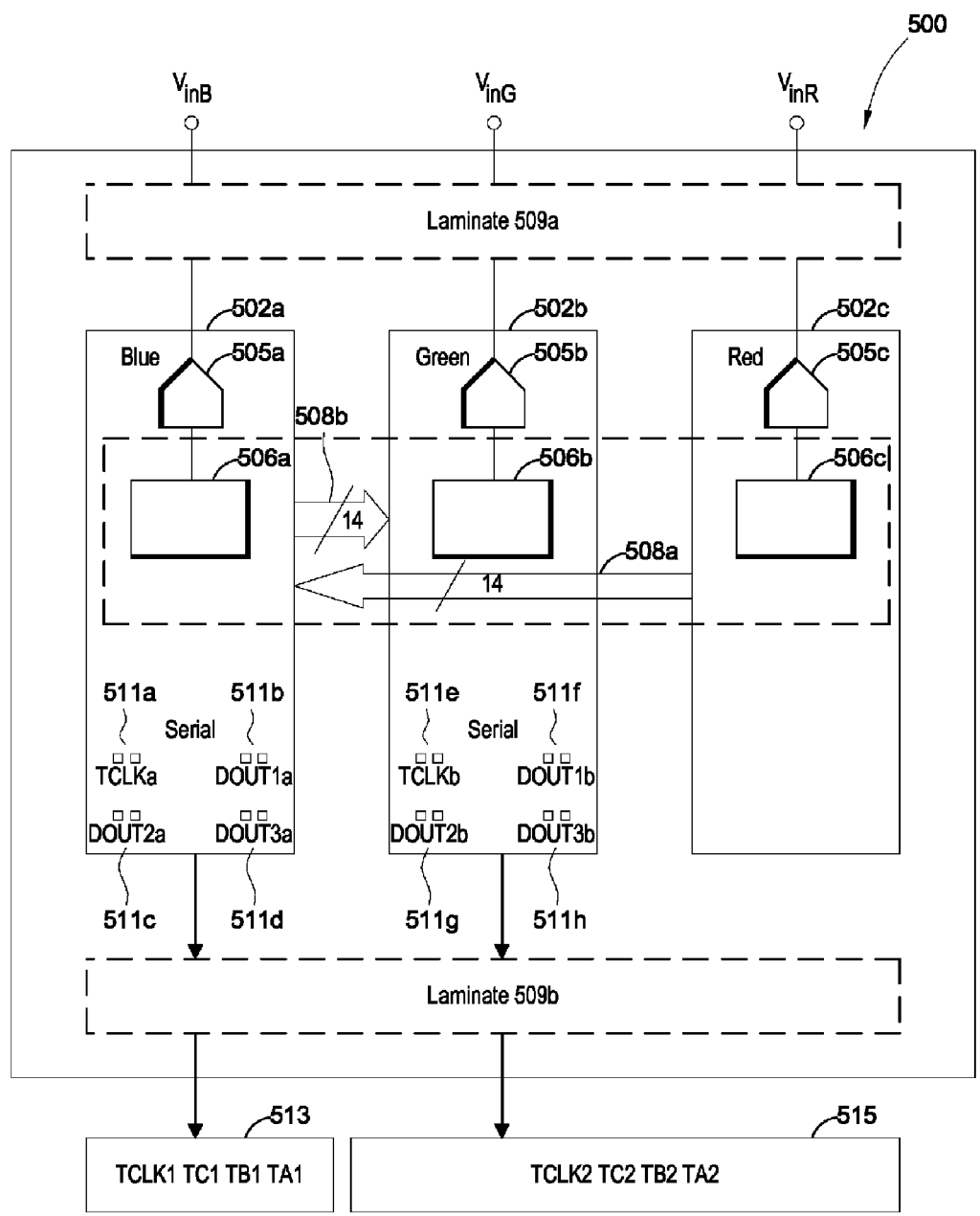
FIG. 5 is a detailed block diagram of an exemplary multi-channel image acquisition system according to aspects of the present invention.

FIG. 5 is a block diagram representation of an analog front end (AFE) image acquisition system implementing various aspects described herein. As has been mentioned, an image acquisition system is one non-limiting example of a data acquisition system which may acquire and process multiple, and sometimes complex, types of data. In the example of FIG. 5, the AFE image acquisition system 500 acquires and processes data relating to three different colors, namely red, green, and blue. It will be appreciated that the example of FIG. 5 is non-limiting, and that the design and operation of the system shown in FIG. 5 could be used to acquire and process other types of data as well, such as spatial data relating to different portions of an image, or any other type of data.

The AFE image acquisition system 500 comprises data acquisition channels for each of the three colors to be acquired and processed: data acquisition channel 502a for blue data; data acquisition channel 502b for green data; and data acquisition channel 502c for red data. The data acquisition channels 502a, 502b, and 502c may be located on a single semiconductor die, or may be located on different semiconductor dies, as the invention is not limited in this respect. As shown, the data acquisition channels are packaged within package 507, and therefore constitute a MCM. However, the invention is not limited in this respect, as data acquisition channels 502a, 502b, and 502c can be in any number of packages, or not packaged at all.

The data acquisition channels 502a, 502b, and 502c may be similar to the data acquisition channels shown in FIGS. 2-4, although the invention is not limited in this respect. For example, one or more of the data acquisition channels may comprise an ADC and a digital processing subcircuit for processing the acquired color data. Alternatively, the data acquisition channels may comprise differing circuitry. However, for the purposes of illustration, each data acquisition channel 502a, 502b, and 502c is shown as comprising a respective ADC 505 as well as a respective digital processing subcircuit 506.

As shown, each data acquisition channel of the AFE image acquisition system 500 receives a respective analog input signal corresponding to the three colors blue, green, and red: channel 502a receives input $V_{inB}$; channel 502b receives input $V_{inG}$; and channel 503c receives input $V_{inR}$. In the illustrated embodiment, because the data acquisition channels 502a, 502b, and 502c are contained within package 507, such as a BGA package, the input signals may be transmitted from outside the package to the data acquisition channels via a laminate 509a. The laminate 509a may be any type of laminate, as the invention is not limited in this respect.

The input signals $V_{inB}$, $V_{inG}$, and $V_{inR}$ may be input to channel circuitry such as the ADCs 505a, 505b, and 505c, which may be coupled to provide digital signals to other channel circuitry, such as digital processing subcircuits 506a, 506b, and 506c for further processing of the signals processed by the ADCs. The ADCs may be 10 bit ADCs, 14 bit ADCs, or may process any number of bits, as they are not limited in this respect.

The digital processing subcircuits may be configured to perform one or more processing functions on the digital color data, and to provide one or more outputs TCLK, $D_{out1}$, $D_{out2}$, and $D_{out3}$, from a respective pair of pads 511, as will be discussed in greater detail below. The output signals may be provided outside the package 507 via a laminate 509b, which may be a same laminate as 509a, or may be a separate laminate, as the invention is not limited in this respect.

The AFE image acquisition system 500 further comprises a parallel data exchange layer 518 which, in the illustrated example, comprises 14-bit bus 508a and 14-bit bus 508b. However, it will be appreciated that the number of bits is not limiting, as the bus could alternatively be a 10-bit bus, or have any number of bits. The data exchange layer is shown as coupling the data acquisition channels 502a, 502b, and 502c, and may do so by coupling the digital processing subcircuits of the data acquisition channels. However, the invention is not limited in this respect, as the data exchange layer could couple any appropriate circuitry of the data acquisition channels. Furthermore, the parallel data exchange layer may alternatively be a serial data exchange layer, and may comprise any coupling means, such as a bus, a serial communication means, wired or wireless communication means, or any other type of coupling means.

An AFE image acquisition system, such as AFE image acquisition system 500, may be operated in various modes. The given mode in which the system is operated may depend on various factors, such as the type and number of data sets to be acquired, and the desired outputs. Two non-limiting modes of operation are now described for purposes of illustration.

Mode 1

In one mode of operation of the AFE image acquisition system 500, it may be desirable to acquire and process data relating to three colors of an image, such as red, green, and blue, and to output two data sets 513 and 515. The first output data set 513 may represent some combination of red and blue data, while the second output data set 515 may represent some combination of blue and green data. The manner in which the data are combined is not limiting.

In this mode of operation, the data acquisition channels 502a, 502b, and 502c may each receive respective analog input signals $V_{inB}$, $V_{inG}$, and $V_{inR}$, representing data relating to the blue, green, and red colors of an image. The respective ADCs 505a, 505b, and 505c may convert the analog input signals to digital signals, and transmit the digital signals to digital processing subcircuits 506a, 506b, and 506c, respectively, for processing in the digital domain.

Because the desired output signals in this mode of operation comprise combinations of the color data, the parallel data exchange layer may function to transmit raw or processed color data from one channel to one or more other channels. For example, the parallel data exchange layer may transmit at least a portion of red data via bus 508a from the red data acquisition channel 502c to the blue data acquisition channel 502a, enabling digital processing subcircuit 506a to process the red and blue color data. Digital processing subcircuit 506a may then provide the desired output representing some combination of the red and blue data. The output data may be provided in any form, as the invention is not limited in this respect. For example, in the illustrated embodiment, the output data set may comprise one clock signal, TCLKa, and three data signals $D_{out1a}$, $D_{out2a}$ and $D_{out3a}$, which are provided serially according to a low-voltage differential signaling (LVDS) protocol. Thus, the outputs are provided at the respective pairs of pads 511a, 511b, 511c, and 511d. Upon being transmitted from the data acquisition channel 502a to the laminate 509b, and provided externally to the package 507, for instance on a package terminal or pin, the output data set 513 may comprise the clock signal TCLK1, and the three data signals TC1, TB1, and TA1.

In this mode of operation, the output data set 515 from data acquisition channel 502b may represent some combination of the blue and green data. Accordingly, the parallel data exchange layer may operate to transmit raw or processed blue data from data acquisition channel 502a to data acquisition channel 502b via 14-bit bus 508b. Data acquisition channel 502b may then process the blue and green data and provide an output data set from the four pairs of pads 511e, 511f, 511g, and 511h. The output data signals may be provided serially, in parallel, or by any appropriate means, and may comprise an output clock signal, TCLKb, and three output data signals $D_{out1b}$, $D_{out2b}$, and $D_{out3b}$. Upon being transmitted from the data acquisition channel 502b to the laminate 509b, and provided externally to the package 507, for instance on a package terminal or pin, the output data set 515 may comprise the clock signal TCLK2, and the three data signals TC2, TB2, and TA2.

Mode 2

A second illustrative mode of operation of the AFE image acquisition system 500 is similar to Mode 1, described above, but differs in the desired outputs. In this second mode, it is desired that output data set 513 represent data corresponding to only the blue channel of the image, while output data set 515 represents some combination of the red and green data. According to this mode of operation, data acquisition channel 502a receives and processes data relating to the blue color of an image, and then provides output signals via pads 511a, 511b, 511c, and 511d. The output signals may comprise a clock signal, TCLKa, and three data signals $D_{out1a}$, $D_{out2a}$, and $D_{out3a}$. Once provided external to the package 507 via the laminate 509b, the output signals may be represented as output data set 513, comprising a clock signal TCLK1, and three data signals TC1, TB1, and TA1, corresponding to blue data.

The data acquisition channels 502b and 502c may each receive respective input signals $V_{inG}$ and $V_{inR}$ corresponding to data relating to the green and red color channels of an image. Because it is desired that the output data set 515 comprise some combination of red and green data, the parallel data exchange layer may operate to transmit at least some portion of the red data from data acquisition channel 502c to data acquisition channel 502b via busses 508a and 508b. Thus, in this mode of operation, data acquisition channel 502a may operate partially as a pass-through for red data being transmitted from data acquisition channel 502c to data acquisition channel 502b.

The data acquisition channel 502b may then process the green and red data and provide output signals TCLKb, $D_{out1b}$, $D_{out2b}$, and $D_{out3b}$ from pairs of pads 511e, 511f, 511g, and 511h, respectively. Once provided external to the package 507 via the laminate 509b, the output signals may be represented as output data set 515, comprising a clock signal TCLK2, and three data signals TC2, TB2, and TA2, and representing some combination of red and green data.

It should be appreciated that the two modes of operation of image acquisition system 500 described above are merely examples, as other modes of operation are possible. For example, the output data sets 513 and 515 may represent combinations of color data other than those described. Moreover, while the output data sets have been described as comprising a clock signal and three data signals, the invention is not limited in this respect, as the output data sets may comprise any type of data, and the format of the data may depend on a specific setting in which the image acquisition system is employed.

Figure 6:
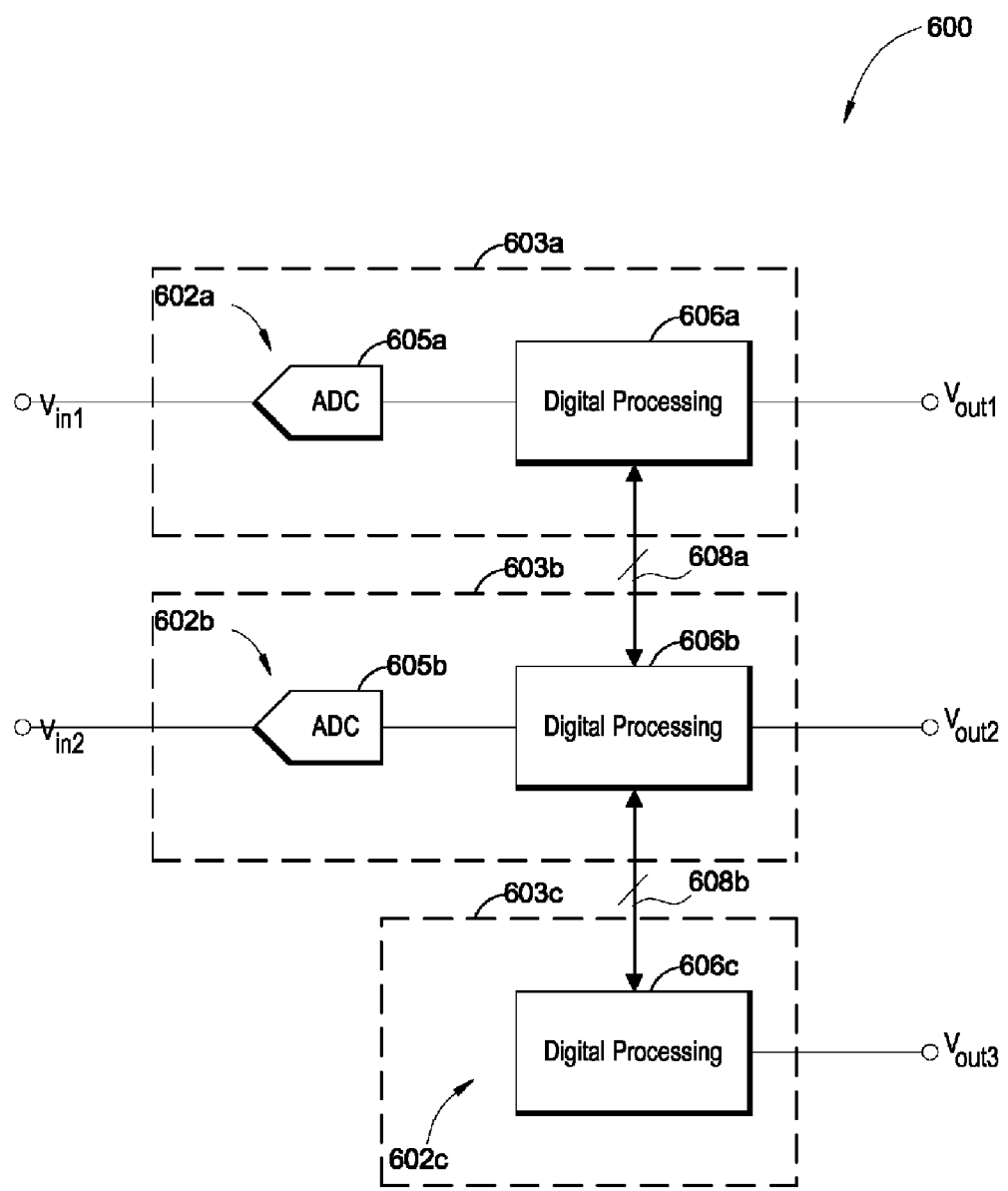
FIG. 6 is a block diagram of a multi-channel data acquisition system having a greater number of outputs than inputs.

FIG. 6 is an example of a data acquisition system having a greater number of outputs than inputs, according to aspects of the present invention. It may be desirable to have a data acquisition system with a greater number of outputs than inputs for any number of reasons, and the invention is not limited to any particular reason for choosing this design. For example, in an image acquisition setting, the data acquisition system may receive analog data corresponding to two or more colors of an image. It may be desirable to output processed data corresponding to each of the colors of the image received, as well as representing some combination of two or more colors. Thus, it would be desirable to provide a greater number of outputs than inputs.

As shown, the multi-channel data acquisition system 600 comprises three channels 602a, 602b, and 602c. The three channels may each be located on a respective semiconductor die 603a, 603b, and 603c, although the invention is not limited in this respect. Furthermore, although no package is shown, one or more of the channels could be packaged by a package such as those shown in FIGS. 2-5.

In FIG. 6, only channels 602a and 602b are configured to receive input data, represented by $V_{in1}$ and $V_{in2}$, respectively. Channel 602c does not receive an input signal, but does provide an output signal $V_{out3}$. Channels 602a and 602b each comprise respective ADCs 605a and 605b, as well as respective digital processing subcircuits 606a and 606b. Channel 603c similarly comprises a digital processing subcircuit 606c.

The channels of data acquisition system 600 are coupled via a data exchange layer comprising bus 608a and bus 608b. Thus, in operation, the channels 602a, 602b, and 602c can exchange raw or processed data amongst themselves in any desired combination. The data acquisition system then provides three output signal, $V_{out1}$, $V_{out2}$, and $V_{out3}$, with one output signal provided by each data acquisition channel.

As an example, the data acquisition system 600 may be an image acquisition system. Channels 602a and 602b may receive and process data relating to the blue and green channels of an image. $V_{out1}$ and $V_{out2}$ may thus correspond to processed output signals of the respective blue and green colors. However, the data exchange layer enables channels 602a and 602b to transmit data to digital processing subcircuit 606c on channel 602c. Digital processing subcircuit 606c may combine, or otherwise process in any manner, the blue and green data from channels 602a and 602b, and then output signal $V_{out3}$ representing the combined processing of the blue and green data. In this manner, the data acquisition system 600 is capable of providing a greater number of output signals than the number of input signals received.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

For example, while this disclosure has included examples of multi-channel data acquisition systems with a single data acquisition channel on each of a plurality of dies, it should be recognized that the invention is not limited in this respect. Rather, multiple data acquisition channels can be located on a single die. For instance, a data acquisition system may comprise a plurality of dies, one or more of which comprise at least two data acquisition channels. A data exchange layer may couple the plurality of data acquisition channels, including those channels on a same die as well as channels on different dies.

While some of the data acquisition channels in various embodiments have been shown as comprising ADCs, the invention is not limited in this respect. Rather, aspects of the present invention may apply to data acquisition systems having data acquisition channels comprising digital-to-analog converters (DACs), rather than, or in addition to, ADCs. Similarly, aspects of the present invention may apply to multi-channel digital signal processing (DSP) systems generally.

Additionally, while the data exchange layer has been shown and described in some examples as being within a semiconductor package (when a semiconductor package is used), those examples are non-limiting. Rather, it is possible to implement the data exchange layer externally to a semiconductor package while providing inter-channel communication for data acquisition channels located on dies within the package. For example, the data exchange layer may comprise means for sending data from one data acquisition channel within a package out of the package on one pin, back into the package on a separate pin, and onto a second data acquisition channel on a die within the package.

Further, the invention is not limited to the terminology used herein. For example, in some embodiments, the output signals from the ADCs have been described as "digitized" signals, while the signals from the digital processing blocks have been described as "processed" signals. It will be appreciated that the terminology is not limiting, as the term "processed" can encompass any processing or modification performed on a raw signal, and can therefore encompass the outputs of the ADCs.

Moreover, it is noted that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A multi-channel data acquisition system providing inter-channel communication, comprising:
   a plurality of data acquisition channels comprising:
      a first data acquisition channel configured to receive and process a first data input signal to produce a first processed data signal, the first data acquisition channel comprising a first data output; and
      a second data acquisition channel configured to receive and process a second data input signal to produce a second processed data signal, the second data acquisition channel comprising a second data output; and
      a data exchange layer coupling the first data acquisition channel and the second data acquisition channel, the data exchange layer configured to transmit the first processed data signal from the first data acquisition channel to the second data acquisition channel, and the data exchange layer configured to transmit the second processed data signal from the second data acquisition channel to the first data acquisition channel,
   wherein the first data output and the second data output are separate, and wherein the first data acquisition channel is configured to place a first output signal on the first data output and the second data acquisition channel is configured to place a second output signal on the second data output, the first output signal based on the first data input signal and the second data input signal, and the second output signal based on the first data input signal and the second data input signal.

2. The multi-channel data acquisition system of claim 1, wherein the first data acquisition channel and the second data acquisition channel comprise substantially identical hardware components.

3. The multi-channel data acquisition system of claim 2, wherein the first data acquisition channel and the second data acquisition channel are substantially identical in their functionality, each of the first data acquisition channel and the second data acquisition channel capable of receiving a data input signal, processing the data input signal, and exchanging processed data signals with another data acquisition channel via the data exchange layer.

4. The multi-channel data acquisition system of claim 3, wherein the first data acquisition channel and the second data acquisition channel have substantially identical fabrication mask layouts.

5. The multi-channel data acquisition system of claim 3:
   wherein the first data acquisition channel comprises:
      a first analog-to-digital converter (ADC) configured to receive the first data input signal and produce a first digital signal; and
      a first data processing subcircuit configured to receive and operate thereon the first digital signal to produce the first processed data signal;
   wherein the second data acquisition channel comprises:
      a second ADC configured to receive the second data input signal and produce a second digital signal; and
      a second data processing subcircuit configured to receive and operate thereon the second digital signal to produce the second processed data signal; and
   wherein the data exchange layer is configured to transmit the first processed data signal to the second data processing subcircuit.

6. The multi-channel data acquisition system of claim 5, wherein the first data acquisition channel is on a first chip and the second data acquisition channel is on a second chip.

7. The multi-channel data acquisition system of claim 5, wherein the first data acquisition channel is in a first package and the second data acquisition channel is in a second package.

8. The multi-channel data acquisition system of claim 5, wherein the plurality of data acquisition channels are part of an image acquisition system.

9. The multi-channel data acquisition system of claim 8, wherein the first data input signal comprises information about a first color of an image and the second data input signal comprises information about a second color of the image.

10. The multi-channel data acquisition system of claim 5, wherein the first data acquisition channel and the second data acquisition channel are configured to output a single output data signal generated by processing the first processed data signal and/or the second processed data signal.

11. The multi-channel data acquisition system of claim 5, wherein the data exchange layer coupling the first data acquisition channel and the second data acquisition channel comprises a bus.

12. The multi-channel data acquisition system of claim 3, wherein the first data acquisition channel comprises an analog-to-digital converter (ADC) having an input configured to receive the first data input signal and an output configured to output the first processed data signal.

13. The multi-channel data acquisition system of claim 12, wherein the ADC is a first ADC, and wherein the second data acquisition channel comprises a second ADC and a data processing subcircuit having a first input coupled to the second ADC, and wherein the data exchange layer is configured to transmit the first processed data signal from the first data acquisition channel to a second input of the data processing subcircuit.

14. A multi-chip module comprising:
a first chip comprising at least one first data acquisition channel configured to receive and process a first data input signal, the first data acquisition channel comprising a first data output;
a second chip comprising at least one second data acquisition channel configured to receive and process a second data input signal, the second data acquisition channel comprising a second data output;
a data exchange layer coupling the first chip and the second chip, the data exchange layer configured to transmit data processed on the at least one first data acquisition channel to the at least one second data acquisition channel; and
a package at least partially encasing the first chip and the second chip and comprising:
a first input terminal coupled to the first chip to provide the first data input signal to the first chip; and
a second input terminal coupled to the second chip to provide the second data input signal to the second chip,
wherein the first data output and the second data output are separate, and wherein the first data acquisition channel is configured to place a first output signal on the first data output and the second data acquisition channel is configured to place a second output signal on the second data output, the first output signal based on the first data input signal and the second data input signal, and the second output signal based on the first data input signal and the second data input signal.

15. The multi-chip module of claim 14, further comprising a laminate coupling the first chip to a third terminal of the package and configured to transmit an output signal from the at least one first data acquisition channel to the third terminal of the package.

16. The multi-chip module of claim 14, wherein the package comprises a ball grid array package.

17. The multi-chip module of claim 14, wherein the package further comprises a third terminal coupled to the first chip to receive an output signal from the first chip, and a fourth terminal coupled to the second chip to receive an output signal from the second chip.

18. The multi-chip module of claim 14, further comprising a third terminal coupled to the second chip and configured to provide an output signal from the second chip representing data processed by the at least one first data acquisition channel and/or the at least one second data acquisition channel.

19. The multi-chip module of claim 14, wherein data exchange layer is further configured to transmit data processed on the at least one second data acquisition channel to the at least one first data acquisition channel.

20. A method for use in a multi-channel data acquisition system comprising a first data acquisition channel configured to receive and process a first data input signal to produce a first processed data signal, the first data acquisition channel comprising a first data output, a second data acquisition channel configured to receive and process a second data input signal to produce a second processed data signal, the second data acquisition channel comprising a second data output, and a data exchange layer coupling the first data acquisition channel and the second data acquisition channel, the method comprising:
transmitting the first processed data signal from the first data acquisition channel to the second data acquisition channel and performing at least one signal processing function on the first processed data signal using the second data acquisition channel
transmitting the second processed data signal from the second data acquisition channel to the first data acquisition channel,
wherein the first data output and the second data output are separate, and wherein the first data acquisition channel is configured to place a first output signal on the first data output and the second data acquisition channel is configured to place a second output signal on the second data output, the first output signal based on the first data input signal and the second data input signal, and the second output signal based on the first data input signal and the second data input signal.

21. The method of claim 20, wherein performing at least one signal processing function on the first processed data signal comprises combining the first processed data signal with the second processed data signal.

22. An expandable multi-channel data acquisition system, comprising:
a first data acquisition channel, the first data acquisition channel comprising a first data output; and
a second data acquisition channel coupled to the first data acquisition channel by a data exchange layer, the second data acquisition channel comprising a second data output;
wherein each of the first and second data acquisition channels is capable of performing the functions of:
acquiring a data input signal;
processing the data input signal; and
sending processed data signals to, and/or receiving processed data signals from, a data acquisition channel via the data exchange layer,
wherein the first data output and the second data output are separate, and wherein the first data acquisition channel is configured to place a first output signal on the first data output and the second data acquisition channel is configured to place a second output signal on the second data output, the first output signal based on the first data input signal and the second data input signal, and the second output signal based on the first data input signal and the second data input signal.

23. The expandable multi-channel data acquisition system of claim 22, wherein the first data acquisition channel and second data acquisition channel are on a same chip.

24. The expandable multi-channel data acquisition system of claim 22, wherein the first data acquisition channel is on a first chip and the second data acquisition channel is on a second chip, and wherein the first chip and the second chip are within a package.

25. The expandable multi-channel data acquisition system of claim 22, wherein the first data acquisition channel is in a first package and the second data acquisition channel is in a second package.

26. A multi-channel data acquisition system providing inter-channel communication, comprising:
    a plurality of data acquisition channels comprising:
        a first data acquisition channel configured to receive and process a first data input signal to produce a first processed data signal,
        a second data acquisition channel configured to receive and process a second data input signal to produce a second processed data signal; and
        a data exchange layer coupling the first data acquisition channel and the second data acquisition channel, the data exchange layer configured to transmit the first processed data signal from the first data acquisition channel to the second data acquisition channel, and the data exchange layer configured to transmit the second processed data signal from the second data acquisition channel to the first data acquisition channel,
    wherein the first data acquisition channel and the second data acquisition channel are substantially identical,
    wherein each of the first data acquisition channel and the second data acquisition channel are capable of receiving a data input signal, processing the data input signal, and exchanging processed data signals with another data acquisition channel via the data exchange layer, and
    wherein the first data acquisition channel comprises:
        a first analog-to-digital converter (ADC) configured to receive the first data input signal and produce a first digital signal; and
        a first data processing subcircuit configured to receive and operate thereon the first digital signal to produce the first processed data signal,
    wherein the second data acquisition channel comprises:
        a second ADC configured to receive the second data input signal and produce a second digital signal; and
        a second data processing subcircuit configured to receive and operate thereon the second digital signal to produce the second processed data signal,
    wherein the data exchange layer is configured to transmit the first processed data signal to the second data processing subcircuit, and
    wherein the data exchange layer coupling the first data acquisition channel and the second data acquisition channel comprises a bus.

\* \* \* \* \*